United States Patent [19]

Aboussouan

[11] 4,330,162
[45] May 18, 1982

[54] TAPE CARTRIDGE STORAGE DEVICE

[76] Inventor: Michel F. Aboussouan, 8135 Clybourn Ave., Sun Valley, Calif. 91352

[21] Appl. No.: 127,133

[22] Filed: Mar. 4, 1980

[51] Int. Cl.³ .............................................. A47B 81/06
[52] U.S. Cl. ....................................... 312/15; 312/19; 206/387
[58] Field of Search ...................... 312/15, 19, 8, 9, 12, 312/13, 14, 16; 206/387

[56] References Cited

U.S. PATENT DOCUMENTS

| 1,033,014 | 7/1912 | Holstein | 312/15 |
| 1,569,207 | 1/1926 | Sears | 312/15 |
| 2,742,161 | 4/1956 | Nuttall | 312/12 |
| 3,743,374 | 7/1973 | Glass | 206/387 |
| 3,866,990 | 2/1975 | McRae | 312/15 |
| 3,969,007 | 7/1976 | Lowry | 312/15 |
| 4,087,138 | 5/1978 | McRae | 206/387 |
| 4,087,145 | 5/1978 | Weavers | 206/387 |
| 4,120,422 | 10/1978 | Propst et al. | 312/19 |
| 4,121,877 | 10/1978 | Brown | 312/15 |
| 4,162,112 | 7/1979 | Konkler | 312/15 |

Primary Examiner—Victor N. Sakran
Attorney, Agent, or Firm—Roger A. Marrs

[57] ABSTRACT

A device or holder is disclosed herein for storing a pre-record program tape cartridge which employs a pair of side panels separated by an end panel so as to define an internal cavity for slidably receiving the cartridge via an open entrance between the side panels. The end panel includes a bottom section having one of its ends at the entrance and its other end integrally formed with an upper section having one end terminating at the entrance, mounted between the side panels, a pair of pivots are disposed for movably supporting a pair of cooperating levers. A selected pivotal lever is adapted to be manually depressed for operating a second pivotal lever. The second lever includes a cartridge engaging end for forcibly urging the tape cartridge out of the cavity via the entrance.

4 Claims, 6 Drawing Figures

TAPE CARTRIDGE STORAGE DEVICE

BACKGROUND OF THE INVENTION

1. Field of the Invention

This invention relates to magnetic tape cartridge storage systems and, more particularly, to a novel tape cartridge storage apparatus or device having lever means for releasably holding a tape cartridge or the like and whereby a plurality of the devices apparatuses may be detachably connected together.

2. Description of the Prior Art

For many years, it has been the conventional practice to pre-record music and other entertainment renditions on an endless loop of magnetic tape which is carried in a cartridge adapted to be inserted into a suitable play-back mechanism, such as a tape recorder. The individual tape cartridges are separate units as well as the play-back mechanism and when a particular tape is selected, the cartridge carrying the tape is inserted into a receiver in the tape recorder so that a drive roller on the tape recorder engages with an exposed portion of the tape for driving the tape past a play-back head. Although such systems have been in use for many years, the space requirements for storage are extremely limited and restricted so that orderly storage of many tape cartridges becomes awkward and creates a problem for the owner.

Normally, in the home or in an automobile, several tape cartridges may be kept in a cabinet or storage compartment or in some instances, a separate wall unit may be installed for holding a quantity of tape cartridges from which the operator may select a particular cartridge. The operator removes the selected cartridge from the storage compartment or cabinet and manually inserts the cartridge into the tape recorder where the play-back mechanism automatically commences play-back of the prerecorded selection.

Many difficulties and problems have been encountered when employing separate storage compartments for tape cartridges in that such a compartment occupies a relatively large volumetric area in addition to the space occupied by the tape recorder. In other instances, the storage compartment is intentionally made of relatively small size so as to hold perhaps five tape cartridges which are selected by the operator from a master storage arrangement within his home and subsequently transferred to the area of limited storage or to a compartment in the automobile. Other problems are encountered when trying to stack storage containers on top of one another since this practice interfers with the users ability to reach and actuate tape displacement and pushbuttons.

Therefore, it can be seen that a long standing need has existed for a suitable tape cartridge or cassette storage system which will allow for vertical stacking without reducing accessibility to the release mechanisms and which employs simplified components and construction.

SUMMARY OF THE INVENTION

Accordingly, the above-mentioned difficulties and problems have been obviated by the present invention which provides a novel tape cartridge or cassette storage apparatus comprising a storage means having an internal cavity defined by a pair of sidewalls separated by an end panel so that one side of the apparatus is open to the cavity. The panel mounts a cartridge stop means for limiting insertion of a cartridge through the entrance into the cavity and further includes a two-part lever means which when pivoted causes an extended finger or arm to forcibly urge the cartridge to project through the entrance from its storage position within the cavity.

Further means are provided for registering and aligning a plurality of the holders and tape cartridges together so that multiple cartridges can be stored in a unitary manner.

Therefore, it is among the primary objects of the present invention to provide a novel tape cartridge or cassette storage apparatus incorporating a cartridge or cassette actuating mechanism for manually urging a cartridge or cassette out of a storage apparatus.

Another object of the present invention is to provide a novel tape storage apparatus wherein a multiplicity of tape cartridges or cassettes may be releasably carried in individual holders which include pivoted lever mechanisms for manually moving or positioning the cartridge or cassette out of the holder in response to manual actualization of the lever mechanism.

Still another object of the present invention is to provide a novel tape storage apparatus in which a plurality of tape cartridges or cassettes are releasably carried on individual holders which include pivoting actuating mechanisms for individually selecting the removal or release of a cartridge or cassette from an individual holder.

Yet another object of the present invention is to provide an individual holder for a tape cassette or cartridge which includes first and second lever mechanisms pivotally mounted between opposing sides of the holder whereby individual actuation of the lever mechanism causes release in outward projection of the stored cartridge or cassette from the holder apparatus.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
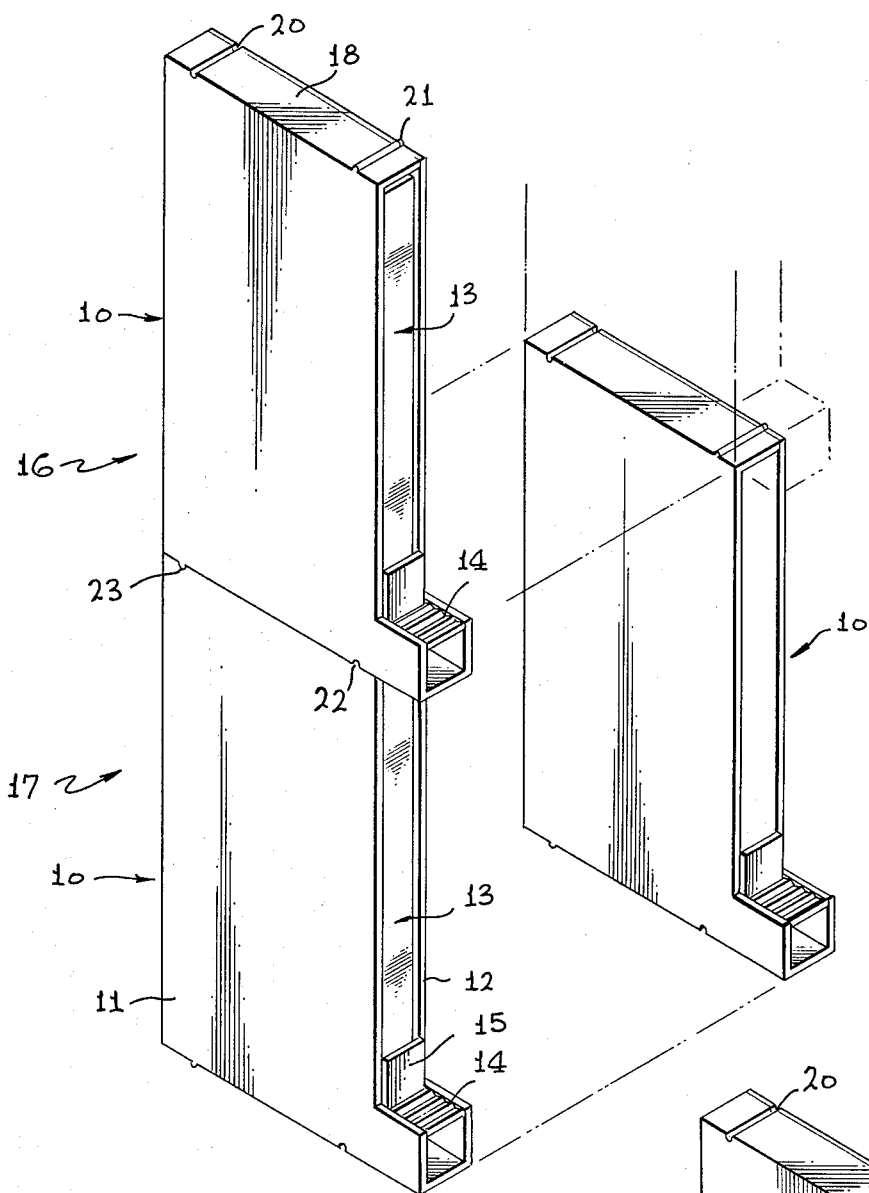
FIG. 1 is a perspective view of the novel tape cartridge or cassette holder apparatus of the present invention illustrating a vertical stacking arrangement.
Figure 2:
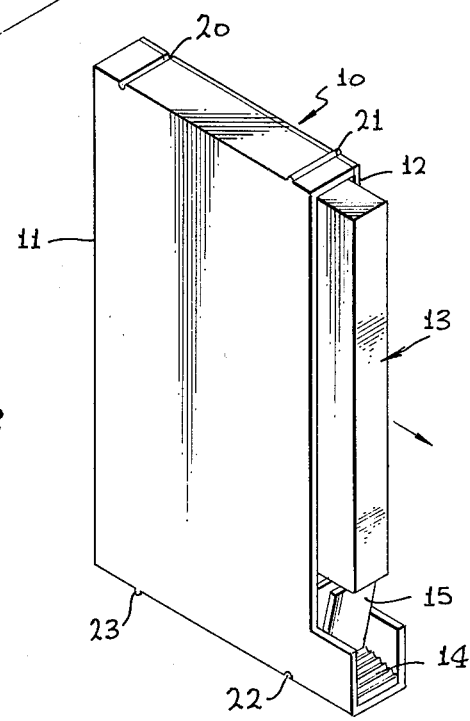
FIG. 2 is a front perspective view of the device illustrating removal of the tape cassette or cartridge when the lever mechanisms are actuated.

Referring to FIGS. 1 and 2, the novel tape cartridge or cassette holder of the present invention is illustrated in the general direction of arrow 10 which includes a holder having side panels 11 and 12 difining a storage cavity between the opposing wall surfaces thereof, in which a typical tape cartridge or cassette is releasably held. The cassette is indicated by numeral 13 and is illustrated in its stored position in FIG. 1 while in FIG. 2, the tape cartridge or cassette is partially deployed from its stored position after actuation of the release mechanism (to be described later). In general, the release mechanism includes a lever terminating end 14 having a plurality of finger engaging ridges which is normally depressed in order to cause deployment of the tape cartridge from its stored position. The lever terminating end 14 further includes an upright portion or element 15 which interfers with the deployment of the tape cartridge or cassette when the terminating end 14 is in the up position as shown in FIG. 1. However, when the terminated end 14 is depressed as shown in FIG. 2, the element 15 is lowered so that it no longer interfers with any outward movement of the cartridge 13.

As shown in FIG. 1, a plurality of tape cartridges may be stored by placing holders in a vertical stack one on top of the other. In so doing, the actuating mechanism, namely lever terminating ends 14, are fully exposed for engagement by the users finger and there is no interference between the holders included in the stack. A bottom or supporting row of holders is indicated in the general direction of arrow 16 while a second or upper row is indicated by numeral 17. In order to provide stability when the holders are arranged in a vertical stack, an upper section 18 is provided with a groove 20 at one end and with and upstanding ridge 21 at its other end. The groove 20 and the ridge 21 are adapted to be insertably received into corresponding grooves and ridges identified by numeral 22 and 23 carried on the opposite or lower section 24 of the case or holder construction.

Figure 3:
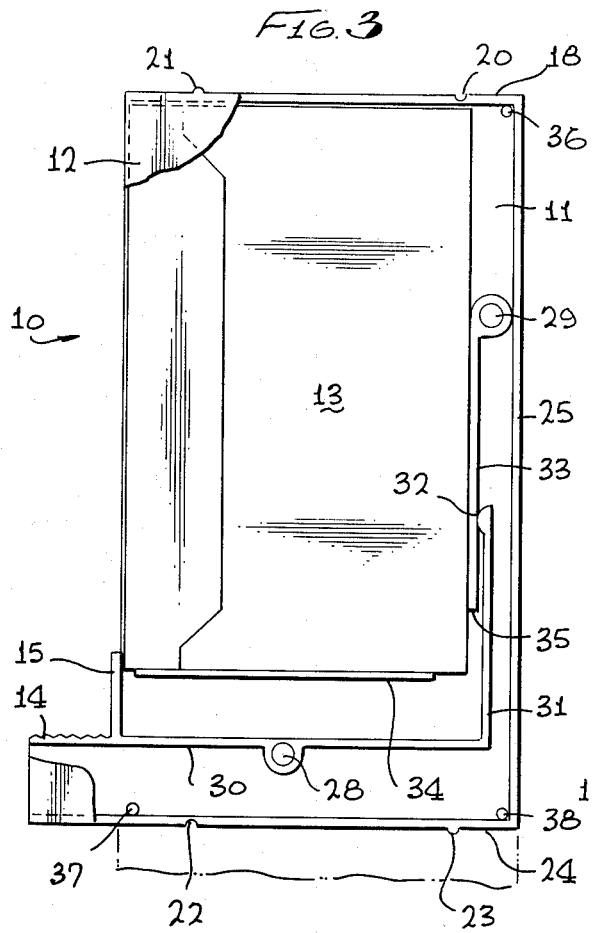
FIGS. 3 and 4 are cross sectional views of the tape holder or device shown in FIGS. 1 and 2 illustrating the lever mechanisms.

Referring to FIG. 3, the novel tape cartridge or cassette holder or apparatus of the present invention is illustrated in the general direction of arrow 10 which includes the pair of side panels 11 and 12 separated by an end panel 25 in such a manner that an internal cavity is defined between the opposing surfaces of the panels and wherein the cavity is occupied by the tape cartridge or cassette 13. The end panel 25 includes upper and lower sections or members 18 and 24 which are widely separated from each other and which in combination with the opposing surfaces of panels 11 and 12 define an opening or entrance leading into the internal cavity intended to be occupied by the cartridge or cassette. Once the cassette has been insertably received within the cavity as defined, removal of the cassette is effected by actuation of the lever mechanism.

Thus, it can be seen that once the cassette or cartridge is assembled within the storage cavity of the holder 10, a unitary structure is provided wherein the cassette is housed in a case and may be sold or distributed in combination therewith for its protection. Conventionally, a plastic case with a flip top is provided with each cassette for its storage and by employing the present invention, the cassette and the case may be sold or dispensed together as a unit which further includes the ejection or release means for removing the cassette from the holder when desired.

It is also to be noted that the lever mechanism further includes a pair of pivot pins 28 and 29 which are intended to be received into registered indexed holes on the panels 11 and 12 respectively. The pivot pins 28 and 29 are intended to rotatably mount the lever mechanism which includes a lever member 30 having the finger depressing portion 14 at one end and an upright element 31 carried at the opposite end at a right angle to the main body of the lever member 30. The element 31 is parallel in fixed space apart relationship with respect to the forward upright element 15. The pivot 28 is substantially midway between the opposite ends of the lever member 30 and the lever is in spaced apart relationship with respect to the lower section 24 of the case. The extreme end of the rear upright member 31 includes an enlarged portion 32 which bears against a second pivotal lever 33 which is mounted for rotation on the pivot 29. However, it is noted that the pivot 29 mounts the pivotal lever 33 at its extreme upper end so that the pivotal lever downwardly depends therefrom and separates the rear upright element 31 from the backside of the cassette 13. The cassette 13 slides on a shelf 34 when actuated by the lever mechanism.

Figure 4:
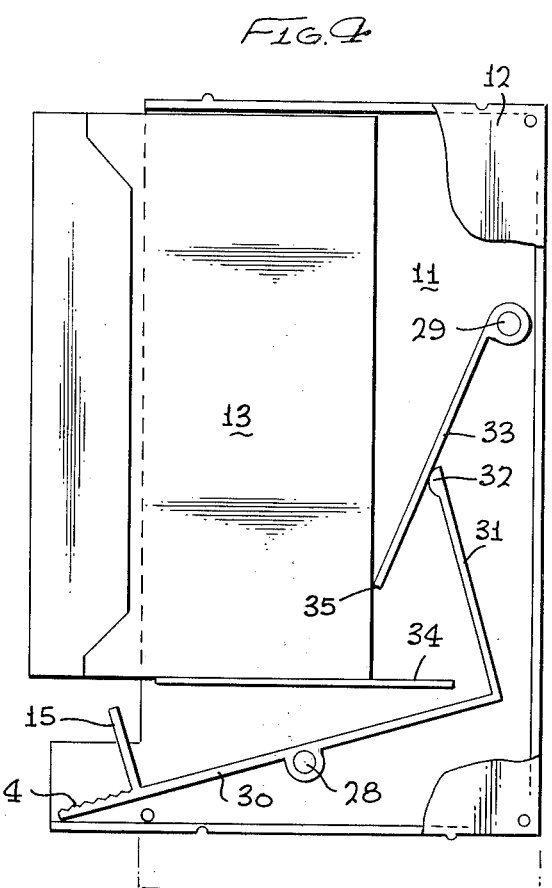

As shown more clearly in FIG. 4, when the lever member 30 has been actuated by a downward depressing force on the end 14, the front upright element 15 lowers so that it no longer interferes with the front corner of the cassette 13. The rear element 31 moves the knob 32 forwardly against the lever 33 so that its end 35 opposite to its end carried on pivot 29 engages the backside of the cassette and forceably urges the cassette outwardly through the entrance to the storage cavity. The cassette 13 slides on shelf 34. The lever 30 can only be depressed until such time as the end 14 engages with the lower section 24 of the case.

The placement of pivot point 29 is extremely important since the higher the pivot is placed, the easier it is to depress the lever 30 for moving the cassette outwardly; however, the travel of the cassette is substantially short. Should the pivot point 29 be lowered, more travel would be gained but the downwardly depression of member 30 would be more difficult and require a greater force to be exerted.

Figure 5:
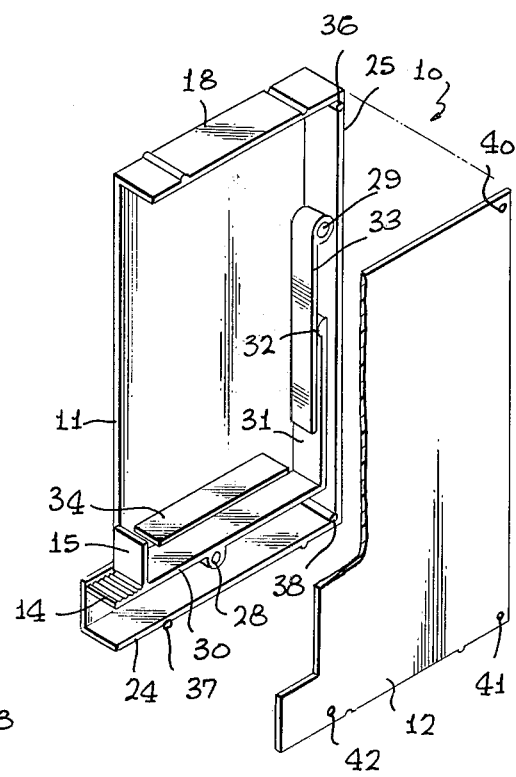
FIG. 5 is an exploded perspective view of the novel holder apparatus shown in FIG. 1 illustrating a side panel thereof removed to expose the lever mechanisms.

Referring now in detail to FIG. 5, it can been seen that the upper and lower sections 18 and 24 as well as the side member 11 include outwardly projecting pins such as pins 36 and 37 and 38 which are intended to be insertably received into indexed and mated holes in the side panel 12. Holes 40 and 41 are intended to slightably the projecting pins. Therefore, it can be seen that the panel 12 is readily removable by manually pulling the panel 12 from the interference fit of the projecting pins with the respective indexed and registered holes.

Figure 6:
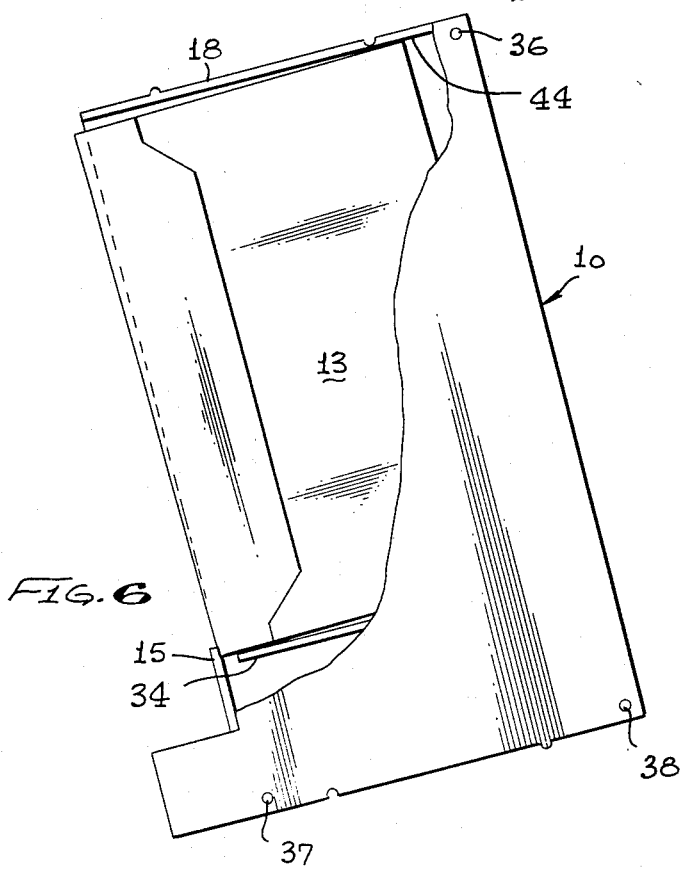
FIG. 6 is a side elevational view of a tape holder illustrating retention of a stored tape cartridge or cassette.

Referring now to FIG. 6, it can be seen that should the storage holder 10 be tipped, the cartridge 13 will not be disloged from its storage within the cavity or compartment since the lower front corner of the cartridge is restrained by interference with the front upright element 15 and the upper rear corner of the cassette will bind against the underside of the upper section 18 at a point indicated by numeral 44.

Therefore, it can be seen that a tape cartridge or cassette 13 may be readily stored in a single holder and that a plurality of the holders may be joined together in order to store a plurality of tape cartridges or cassettes. In addition to a horizontal array or stacking of the cassette holders, vertical storage is provided as shown in FIG. 1 without interference with the finger depression portions 14. These portions are fully exposed to the user.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tape cartridge storage apparatus comprising the combination of:
   a holder having upper and lower sections joined by a rear section separating a pair of side panels to define an internal storage cavity for slidably receiving a tape cartridge via an open entrance between said side panels at one end thereof;
   lever means operably carried on pivots between said side panels adapted to be manually depressed for forciably urging said tape cartridge out of said storage cavity via said entrance;
   said one side panel being fixed to said upper and lower sections and the other side panel detachably secured to the side of said upper and lower sections opposite to its side fixed to said one side panel;
   detachable means for securing said other side panel to said upper and lower sections which include a plurality of pins outwardly projecting from said spacer and a plurality of holes carried on said other side panel in registry with said plurality of pins;
   said pins being insertably received in respective associated registered ones of said holes to provide an interference fit therebetween;
   said one side panel includes a plurality of holes provided on its external surface adapted to insertably receive an interference fit with said pins from another of said upper and lower sections to that plurality of said holders are arranged in a stack in a side-by-side array;
   said lever means includes a first lever pivotably carried at its mid-section on the inner surface of said one side panel having a finger depressing end exposed exteriorly of said holder and its opposite end provided with a rear upright element projecting into said storage cavity; and
   a second lever pivotably carried on one of its ends on the inner surface of said rear section having its med-section engagable by the end of said rear upright element of said first lever and the terminating opposite end of said second lever adapted to engage with said tape cartridge in response to said aforementioned first and second lever engagement; and
   said first lever having a front stop member projecting upwardly at the entrance to said internal storage cavity interferring with withdrawal of said tape cartridge from said cavity.

2. The invention as defined in claim 1 including:
   an upwardly extending projection carried on said first lever adjacent said finger depressing end selectively engageable with said tape cartridge to prevent ejection of said tape cartridge when said second lever opposite end is not engaged with said tape cartridge.

3. The invention as defined in claim 2 wherein:
   said first lever pivots counter clockwise to actuate said second lever by pivoting in a clockwise direction to effect ejection of said tape cartridge from said internal storage cavity.

4. The invention as defined in claim 3 including:
   at least one groove and one ridge provided on the exterior surface of said upper and lower sections adapted to engage with a groove and ridge respectively associated with another holder.

* * * * *